US006665064B2

(12) United States Patent
Hermann

(10) Patent No.: US 6,665,064 B2
(45) Date of Patent: Dec. 16, 2003

(54) ELECTROOPTICAL MEASUREMENT DEVICE FOR ASCERTAINING THE RELATIVE POSITION OF BODIES OR OF SURFACE AREAS OF THESE BODIES

(75) Inventor: Michael Hermann, Villingen-Schwenningen (DE)

(73) Assignee: Prüftechnik Dieter Busch AG, Ismaning (DE)

( * ) Notice: Subject to any disclaimer, the term of this patent is extended or adjusted under 35 U.S.C. 154(b) by 154 days.

(21) Appl. No.: 09/995,559

(22) Filed: Nov. 29, 2001

(65) Prior Publication Data

US 2002/0063859 A1 May 30, 2002

(30) Foreign Application Priority Data

Nov. 30, 2000 (DE) .......................................... 100 59 728

(51) Int. Cl.[7] .............................................. G01B 11/26
(52) U.S. Cl. ...................................... 356/153; 356/154
(58) Field of Search ............................. 356/153, 154, 356/138, 615, 616, 620, 622, 399

(56) References Cited

U.S. PATENT DOCUMENTS

| 4,518,855 | A | * | 5/1985 | Malak ..................... 356/141.3 |
| 4,906,097 | A | | 3/1990 | Wiedemann |
| 5,035,503 | A | * | 7/1991 | Sadeh et al. ............. 356/141.3 |
| 5,077,905 | A | * | 1/1992 | Murray, Jr. ................... 33/412 |
| 5,418,562 | A | | 5/1995 | Roundy et al. |
| 5,440,338 | A | | 8/1995 | Roundy et al. |
| 6,043,889 | A | * | 3/2000 | Garner ....................... 356/614 |
| 6,476,914 | B1 | | 11/2002 | Hoelzl et al. |

FOREIGN PATENT DOCUMENTS

| CH | 675 910 A | 11/1990 |
| DE | 197 47 872 A | 5/1999 |
| DE | 199 53 451 | 6/2000 |
| EP | 0 316 624 | 5/1989 |
| EP | 0 807 801 | 11/1994 |
| EP | 0 962 746 A2 | 12/1999 |
| GB | 2 268 021 | 12/1993 |
| GB | 2 330 470 A | 10/1998 |
| GB | 2 330 470 | 4/1999 |
| WO | WO 98/33039 | 7/1998 |

OTHER PUBLICATIONS

Tetlow S. et al., Three–Dimensional Measurmenet of Underwater Work Sites Using Structured Laser Light, Measurement Science and Technology, IOP Publishing, Bristol, GB, Bd. 10, Nr. 12, Dec. 1999, pp. 1162–1167.

\* cited by examiner

*Primary Examiner*—Frank G. Font
*Assistant Examiner*—Roy M. Punnoose
(74) *Attorney, Agent, or Firm*—Nixon Peabody LLP; David S. Safran

(57) ABSTRACT

To detect the relative position of bodies, surfaces or the like, especially those on machines, there is an optoelectronic sensor. The latter reacts to incident light, for example, monochromatic laser light. The available receiving surface is however comparatively small for low-cost or pixel-oriented sensors. By making available a diffuser and a projecting objective lens in front of an optoelectronic sensor the usable receiving surface for incident light can be greatly increased. The diffuser or also the projecting objective lens can additionally be designed as a color filter and can be used to reduce the effects of outside light. A process is provided with which an especially accurate determination of the median point of the laser light spot incident on the target (optoelectronic sensor) can be achieved.

6 Claims, 2 Drawing Sheets

ELECTROOPTICAL MEASUREMENT DEVICE FOR ASCERTAINING THE RELATIVE POSITION OF BODIES OR OF SURFACE AREAS OF THESE BODIES

RELATED APPLICATION DATA

This application claims the benefit of and priority to German Patent Application No. 100 597 28.9 filed Nov. 30, 2000, incorporated herein by reference in its entirety.

BRIEF DESCRIPTION OF THE INVENTION

The invention relates to a device for ascertaining the relative position of bodies or of surface areas of these bodies. The invention is especially suitable for alignment of machines, or successive machines, such as machine trains. The object of the invention is comparable to the one formulated in the PCT Application PCT/EP97/00274, incorporated herein by reference in its entirety.

DESCRIPTION OF RELATED ART

PCT Application PCT/EP97/00274 discloses, known devices of this type have a measurement arrangement which uses at least one light beam emitter and at least one monoaxial or multiaxial optoelectronic position detector. For the sake of brevity, reference is made to the contents of the indicated PCT application, especially its drawings and specifically FIGS. 1 to 3.

PCT/EP97/00274 thus discloses a satisfactory approach to how widening of the area can be achieved essentially using software in position detectors with effective receiving surfaces which are too small for a measurement task.

SUMMARY OF THE INVENTION

In any case, the application of the teaching from the indicated PCT application for especially small (generally with a small area) position detectors leads to the need for relatively frequent manual shifting of the sensor housing; this would, for example, make handling by an operator unreasonably difficult for small sensor types.

An exemplary object of the invention is to make available an alternative approach to the posed problem for widening the area in small-area position detectors which enables essentially simplified handling even for machines which are seriously out of calibration. This approach will allow the use of commercial CCD or CMOS image sensors which do have a very large number of pixels which can be individually resolved, but which are equipped only with an effective surface as small as possible for, for example, lower production costs. Direct use of these economical CCD or CMOS image sensors in a means of the generic type is not practical and therefore requires more extensive measures for their satisfactory applicability.

This object is achieved through an optical widening of the beam path compared to optical beam paths as are used for conventional light beam emitter or position detector combinations.

For example, instead of a conventional impact or target surface for a light beam (preferably laser light beam), a matt disk is used which typically has roughly 2 to roughly 20 times larger linear dimensions than the position detector to be used, and which thus represents a correspondingly larger usable receiving surface. In this way, instead of a measurement surface of 0.5 square centimeters (50 square millimeters) a usable surface of, for example, roughly 2 to 200 square centimeters can easily be made available. This is a major advantage for the alignment of large machines such as turbines or in shipbuilding.

In addition to the indicated matt disk, a projection means is used which images the matt disk by means of an objective lens to scale and conformally onto the position detector to be used, and in doing so undertakes linear reduction by a factor of roughly 2 to 20. It is important to have scattered light portions which are as diffuse as possible reaching the optoelectronic position detector. For this purpose it is advantageous to provide the indicated matt disk with a color-filtering effect. It can be made, for example, as a red filter. In addition, it is useful to protect the matt disk by, for example, visor-like shading devices against incident outside light.

Therefore, in the invention, a device is to be made available which has at least the following features.

The device is made as an electrooptical measurement device and is used to ascertain the relative position which is assumed by two bodies or surface areas of bodies with reference to one another. The device is made as a measurement arrangement with at least one light beam emitter and at least one optoelectronic position detector which acts along one axis or several axes, with a photosensitive measurement surface. The light beam emitter is suited for directing a focussed light beam of low divergence, for example a laser beam, onto the photosensitive measurement surface of the position detector. The position detector is able to deliver electrical signals which correspond to the coordinates of the instantaneous light beam impact point on the measurement surface. A combination of a diffuser (40) which is mounted in the housing and a projection objective lens (50), which combination widens the measurement area and which modifies the optical beam path, is optically connected upstream of the position detector.

The invention is improved by a process with which it is possible to determine the delivered coordinates of the instantaneous light beam impact point with especially high precision.

DETAILED DESCRIPTION OF THE INVENTION

Figure 1:
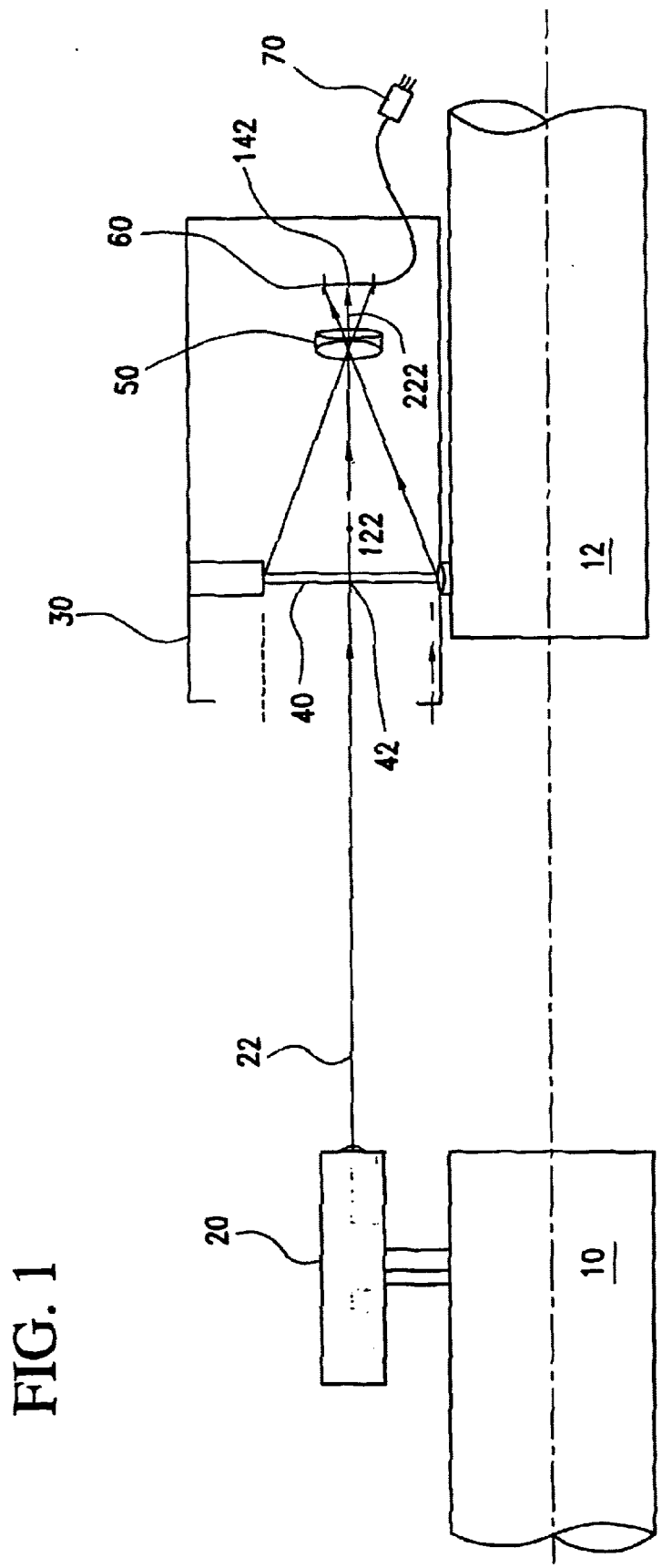
FIG. 1 shows the beam path for a light beam of low divergence and narrow cross section between the light beam transmitter and the optoelectronic position detector.

One light beam emitter 20 which emits a light beam 22 is located, for example, on a first shaft 10. The latter is opposite a shaft 12 which is to be aligned. Instead of the shafts, other bodies which are to be aligned can be used. On the shaft 12, a matt disk or diffuser 40, which scatters wave fronts which are incident parallel in almost all directions of space are mounted in a housing 30. This matt disk is preferably made as a filter such that light of the color of the light beam 22 emitted from the light beam emitter 20 is transmitted in the direction of the position detector 60. The position detector 60 operates optoelectronically and can preferably be read out according to two directions (x and y). It can be made as a position-sensing semiconductor element (PSD), a pixel-oriented image sensor or the like.

A light spot 42, which is caused by the light beam 22, is therefore strongly scattered by the matt disk 40 so that information about its direction of incidence on the back of the matt disk is essentially eliminated. There only the coordinates of the light spot position can be established. In accordance with the invention, this takes place by means of the projection objective lens 50 which should be of sufficient luminous intensity, but need be tuned only to the wavelength of the light beam 22 and therefore can have a simple structure. Therefore, the projection objection lens 50 can be made as a plastic lens which can likewise be colored to improve the filtering action against outside light of a different color and acts as an additional filter means. The focal length of the projection lens 50 should be specified according to the housing dimensions so that the image plane of the matt disk 40 is imaged reduced with usable focusing onto the image plane of the position detector 60. As shown, a light beam 122 emerges from the pixel 42 which is subjected to light scattering and impacts on the projection objective lens 50 and afterwards is recorded as a pixel 142 on the position detector 60. For detection of one such pixel 142 using measurement engineering, there is known microelectronics which are connected by means of a data line and plug device 70 to a downstream computer so that signals of interest can be evaluated. These signals are evaluated preferably for the purpose of aligning the machines or bodies involved. Conventionally, it is therefore necessary to provide not only one individual matt disk together with the objective lens and the position detector for purposes of this alignment, but a plurality of these system components.

The proposed measurement process achieves its noteworthy accuracy also by several, typically several hundred or even several thousand pixels which can be evaluated being produced by the laser beam and the image of a light spot which is to be observed on the target. By averaging, the location of the light spot to be measured can be indicated with high precision. In accordance with the invention, a process can be devised with which it is possible to carry out especially accurate averaging so that the coordinates can be indicated with especially high precision with respect to the x and the y value of the light spot to be observed on the target.

Figure 2:
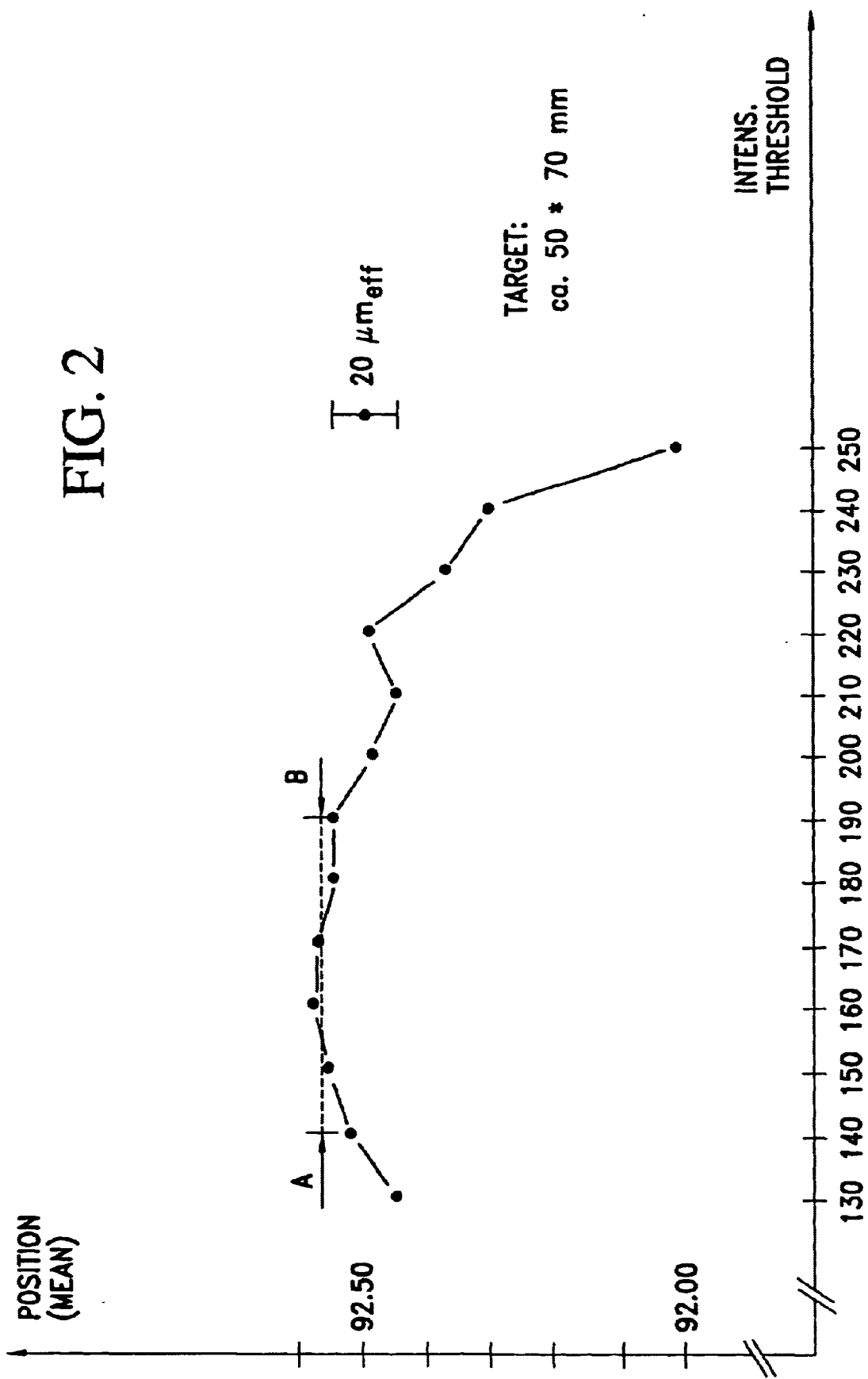
FIG. 2 shows the determined position values for the light beam impact point as a function of predefined intensity threshold values.

As was found, and as is shown in FIG. 2, the positions of the light spot which can be determined depend on whether all illuminated pixels are evaluated for purposes of averaging, or only those which are characterized by minimum brightness, or optionally maximum brightness.

For example, it is advantageous to evaluate only those pixels which are characterized by a certain minimum brightness even if in this way some of the available information is ignored.

FIG. 2 shows how, by averaging, the varied position information is computed for the x-coordinates of the light spot, for example, depending on a given minimum brightness of the evaluated pixels. The minimum brightness is defined by a threshold which was varied, for example, on the x-axis in FIG. 2 between the values of 130 and 250. As is apparent, it is not advantageous to evaluate the brightest pixels and it is likewise disadvantageous to evaluate overly dark pixels, since this leads to an apparent shift of the median point of the observed light spot. Information which is dependent as little as possible on the illumination effects for the light spot is precisely given when preferably the pixels of medium brightness are delivered to the desired averaging. In FIG. 2, this is therefore the area which is roughly above the threshold value of 140 and below the threshold value of 190, as indicated by arrows "A" and "B".

One exemplary threshold range is automatically defined by an evaluating computer which is connected downstream of the position detector 60. This takes place by a comparable function behavior being determined for the light spot to be currently evaluated, as is apparent from FIG. 2. In the area of the peak of the function which has been determined in this way "apparent median point value vs. threshold value" a plateau with a predefined variance of the function values is assumed, and only pixels with an intensity which can be assigned to the plateau defined in this way are then used to establish the best value for the median point of the light spot. This process is used successively both for the x and y coordinates of the median point of the observed light spot.

As mentioned, pixels can be selected which are characterized by at least minimum brightness. In a more extensive selection, only those pixels which in addition are not brighter than stipulated by an upper threshold value can be subjected to a further computation process. The accuracy of the position determination for a light spot to be observed can be clearly increased by the indicated process so that for a target with effective dimensions of roughly 50×70 mm, the position of the incident laser light can be determined to better than +/−10 microns. Although it is only described above in what form the median point of the light spot can be determined in an improved manner for one coordinate, it goes without saying that enables overall improved determination of the median point for the light spot according to two coordinates.

What is claimed is:

1. An electrooptical measurement device for ascertaining a relative position which is assumed by two bodies or surface areas of bodies with reference to one another, comprising:

at least one light beam emitter and at least one optoelectronic position detector which acts along one or more axes;

a photosensitive measurement surface wherein the light beam emitter directs a focused light beam of low divergence onto the photosensitive measurement surface of the position detector and wherein the position detector delivers electrical signals which correspond to the coordinates of the instantaneous light beam impact point on the measurement surface;

a diffuser; and a projection objective lens;

wherein the combination of the diffuser and the projection objective lens widens the measurement area and modifies the optical beam path.

2. The device of claim 1, wherein the light beam emitter is a laser.

3. A process for determining the relative position of two bodies or surface areas of bodies with reference to one another, comprising the steps of:

producing a light beam impact point on a two-dimensional translucent target;

imaging the light beam impact point on the measurement surface of an optoelectronic target which can be read out two-dimensionally;

recording of the light intensity for a portion of the pixels of the sensor which are illuminated by the imaged light beam impact point;

repeatedly determining the median point for the light intensity recorded on the sensor, according to one or two coordinates, as a function of several predefined intensity threshold values;

determining the functional relationship between the median point and several predefined intensity threshold values;

determining the plateau area for the functional relationship of the median point to several predefined intensity threshold values, according to at least one coordinate assigned to the optoelectronic target;

using at least one of a maximum value of the median point or a value of the median point, which value is symmetrical to the plateau boundaries, for defining the best value of the median point of a light spot to be measured; and determining using use of the best value to determine the mutual relative position of articles.

4. The process of claim 3, further comprising:

determining the median point for the recorded light intensity on the optoelectronic sensor according to one or two coordinates, with consideration of only those pixels with an intensity which corresponds to the intensity interval which is assigned to the determined plateau area ("A-B") of the function "median point vs. intensity threshold value;" and using the median point determined in this way to define the best value of the median point for a light spot to be measured.

5. A method for determining the relative position of two bodies or surface areas of bodies with reference to one another comprising:

producing a light beam impact point on a two-dimensional translucent target;

imaging the light beam impact point on the measurement surface of an optoelectronic target which can be read out two-dimensionally;

recording the light intensity for a portion of the pixels of the sensor which are illuminated by the imaged light beam impact point;

repeatedly determining the median point for the light intensity recorded on the sensor, according to one or two coordinates, as a function of several predefined intensity threshold values;

determining the functional relationship between the median point and several predefined intensity threshold values;

determining the plateau area for the functional relationship of the median point to several predefined intensity threshold values, according to at least one coordinate assigned to the optoelectronic target;

using at least one of a maximum value of the median point or a value of the median point, which value is symmetrical to the plateau boundaries, for defining the best value of the median point of a light spot to be measured; and determining using use of the best value to determine the mutual relative position of articles.

6. The method of claim 5, further comprising:

determining the median point for the recorded light intensity on the optoelectronic sensor according to one or two coordinates, with consideration of only those pixels with an intensity which corresponds to the intensity interval which is assigned to the determined plateau area ("A-B") of the function "median point vs. intensity threshold value;" and using the median point determined in this way to define the best value of the median point for a light spot to be measured.

* * * * *